United States Patent [19]

Gaiser et al.

[11] Patent Number: 4,553,651
[45] Date of Patent: Nov. 19, 1985

[54] COMBINATION HILL HOLDER AND PROPORTIONING VALVE MECHANISM

[75] Inventors: Robert F. Gaiser, Stevensville, Mich.; Lawrence R. Myers, South Bend, Ind.

[73] Assignee: Allied Corporation, Morristown, N.J.

[21] Appl. No.: 528,812

[22] Filed: Sep. 2, 1983

[51] Int. Cl.[4] .......... B60K 41/24; B60T 8/00
[52] U.S. Cl. .......... 192/13 A; 192/3 H; 303/24 A
[58] Field of Search .......... 192/4 A, 13 A, 3 H; 303/24 A, 24 F, 24 BB; 188/349

[56] References Cited

U.S. PATENT DOCUMENTS

| 2,030,288 | 2/1936 | Freeman | 192/13 A |
| 2,136,410 | 11/1938 | Boldt et al. | 192/13 A |
| 4,247,154 | 1/1981 | Shoji et al. | 303/24 A |
| 4,382,636 | 5/1983 | Yoshino | 188/349 |
| 4,444,436 | 4/1984 | Koshimizu | 188/349 X |
| 4,444,437 | 4/1984 | Mortimer | 188/349 X |

FOREIGN PATENT DOCUMENTS 2069643  8/1981  United Kingdom .

Primary Examiner—George H. Krizmanich
Attorney, Agent, or Firm—Larry J. Palguta; Ken C. Decker

[57] ABSTRACT

A control device for a vehicle brake system includes a proportioning valve assembly, an inertia sensing valve member and a hill holder valve member in a unitary housing. The inertia sensing valve member is operable in response to vehicle deceleration to control fluid communication via a bypass passage circumventing the proportioning valve assembly.

9 Claims, 1 Drawing Figure

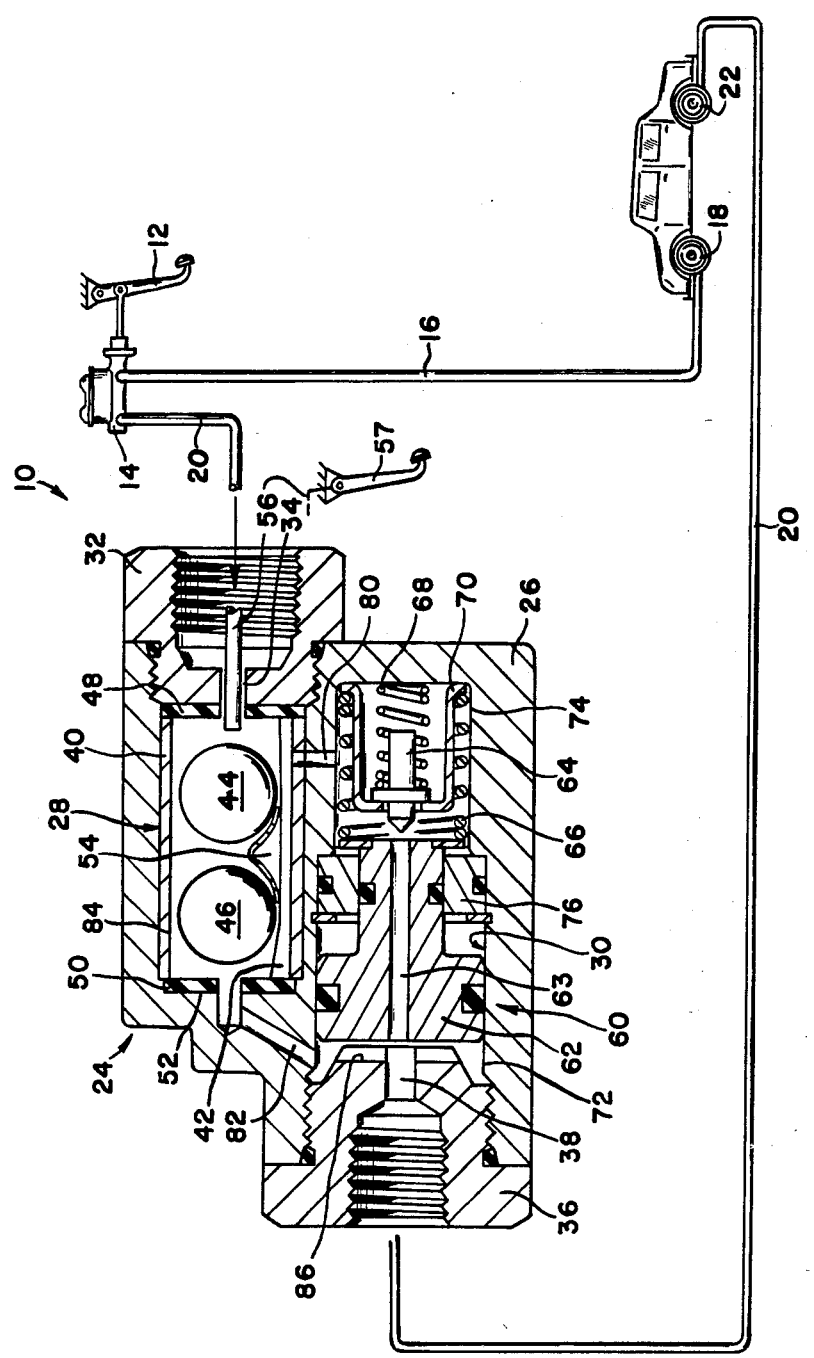

COMBINATION HILL HOLDER AND PROPORTIONING VALVE MECHANISM

This invention relates to a control device for a vehicle, and more particularly, a control device integrally combining features for proportioning with bypass and hill holding into a unitary housing.

It is known that a hill holder valve can be inserted into a brake line to retain fluid pressure in a brake circuit when a vehicle is on a hill and a clutch for the vehicle is disengaged. The hill holder valve enables a vehicle operator to keep one foot on the clutch pedal and the other foot on the accelerator to negotiate forward movement after stopping on a hill. It is also known that a proportioning valve can be inserted into the brake circuit or circuits, for the rear wheels so that fluid pressure to the rear wheels will be reduced to avoid wheel lock for the rear wheels during braking. When a vehicle is provided with a hill holder valve and a proportioning valve, it is necessary to add separate units to the brake circuits, thereby increasing the number of potential leak points. In addition, if the hill holder valve is designed to work for the rear wheels, the proportioning valve is pressure responsive to reduce fluid pressure communicated to the rear wheels. Consequently, the proportioning valve works against the hill holder valve, so that the reduced fluid pressure communicated to the rear wheels may be insufficient to hold the vehicle on a hill.

The present invention overcomes these problems by providing a control device for a vehicle having a clutch-like assembly and a brake system wherein fluid pressure is generated in a master cylinder for communication to a front brake and a rear brake, the control device being disposed between the master cylinder and the rear brake whereby fluid pressure generated in the master cylinder is communicated to the rear brake via the control device, the control device including a proportioning valve responsive to a brake application to selectively alter fluid communication from the control device to the rear brake, and the control device including valve means associated with the proportioning valve to control the operation of the latter, characterized in that said control device defines a pair of independent fluid paths communicating said master cylinder with said rear brake, said proportioning valve being disposed within one of said pair of independent fluid paths, said valve means being disposed in the other of said pair of independent fluid paths, said valve means including a pair of valve members, one of said pair of valve members being operable in response to the angle of the surface supporting the vehicle and the clutch-like assembly to hold fluid pressure within the rear brake when the vehicle is facing a hill, and the other of said pair of valve members being inertia sensing to prevent fluid communication through said other independent fluid path when deceleration for the vehicle is above a predetermined value to direct fluid communication through said one independent fluid path.

It is an advantage of the present invention that a control device combines a hill holder valve with a proportioning valve such that full fluid pressure is utilized during operation of the hill holder valve to bypass the proportioning valve.

The sole drawing illustrates a braking system for a vehicle schematically with the control valve of the present invention illustrated in cross-section.

A brake system 10 includes a brake pedal 12 connected to a master cylinder 14 to generate fluid pressure in the master cylinder 14 during braking. Fluid pressure is communicated via conduit 16 to a set of front brakes 18 and via conduit 20 to a set of rear brakes 22. A control device 24 is disposed in the conduit 20 to fluidly communicate the master cylinder 14 with the set of rear brakes 22 via conduit 20.

The control device 24 includes a housing 26 with a pair of stepped bores 28 and 30. A plug 32 extends into the bore 28 to form an inlet 34 in the latter, while a plug 36 extends into the bore 30 to form an outlet 38 in the latter. The housing is positioned in the vehicle so that the plug 36 is disposed toward the front of the vehicle and the plug 32 is disposed toward the rear of the vehicle. The bore 28 receives a sleeve 40 with ribs 42 to carry a pair of valve members 44 and 46 formed by identical balls, although the balls could be different in size. The plug 32 extends into the bore 28 to cooperate with the sleeve so that a seat 48 is fixedly disposed between one end of sleeve 40 and the plug 32 while a seat 50 is disposed between the other end of sleeve 40 and an end wall 52 for bore 28. The sleeve 40 also forms a spacer 54 to maintain the valve member 44 separate from the valve member 46. The sleeve ribs 42 form an angle of about 12° relative to a horizontal axis to the left of spacer 54 for valve member 46 and an angle of about 2° to the right of spacer 54 for valve member 44. A clutch link 56 extends into the inlet 34 to prevent valve member 44 from engaging seat 48 in a manner hereinafter described. The clutch link is connected via suitable means with a clutch pedal 57.

The bore 30 receives a proportioning valve assembly 60 comprising a differential diameter piston 62 with passage 63 and a poppet 64. A first spring 66 biases the piston 62 away from the poppet 64 and a second spring 68 yieldably retains the poppet 64 adjacent the piston 62 but spaced therefrom a distance controlled by the length of spring collar 70. The bore 30 is stepped to form a large diameter section 72 and a small diameter section 74. The piston 62 engages the large diameter section 72 and a ring 76 is fixedly disposed within the large diameter section. The piston engages the ring 76 at a smaller diameter than the diameter of section 74.

The housing 26 defines a first passage 80 extending from the bore 28 to the bore 30. The first passage 80 is disposed between the seats 48 and 50 in bore 28 and at the small diameter section 74 in bore 30. A second passage 82 extends from a central opening 84 for seat 50 to the large diameter section 72 of bore 30 adjacent plug 36 so that movement of the piston 62 will not cover up the second passage 82. The plug 36 is slotted at 86 to provide fluid communication between the second passage 82 and the outlet 38 even when the piston 62 is abutting the plug 36.

During a brake application, fluid pressure is communicated from the master cylinder 14 to the front brakes 18 via conduit 16 and also to the rear brakes 22 via conduit 20. Fluid pressure in the conduit 20 is communicated through the control valve 24 via two independent flow paths. The first flow path comprises inlet 34, bore 28, passage 82, bore section 72, and outlet 38. The second flow path comprises inlet 34, bore 28, passage 80, bore section 74, passage 63, bore section 72 and outlet 38. If the vehicle is moving on a level road surface during braking, the ball 44 will remain adjacent the spacer 54 and the ball 46 will sense the change in inertia for the vehicle and will move towards seat 50. If deceleration is below a predetermined value, the ball 46 will remain spaced from the seat 50 so that fluid pressure will communicate through both flow paths to the rear wheels. If deceleration is above the predetermined value, the ball 46 will engage the seat 50 to close opening 84 and passage 82. Above the predetermined deceleration value, the piston 62 will move toward the poppet 64 in response to the fluid pressure level communicated through conduit 20 to the second flow path and bore 30 to restrict fluid communication through passage 63. As a result, the fluid pressure communicated to the rear brakes will be less than communicated to the front brakes to reduce the risk of rear wheel lock up. If the fluid pressure communicated to bore 30 moves piston 62 into engagement with poppet 64 to reduce communication of fluid pressure to the rear brakes but the deceleration is below the predetermined value, for example with a fully loaded vehicle, or a hydraulic failure in the front brake path 16 and 18, the ball 46 will remain spaced from seat 50. Therefore, fluid pressure will be communicated to the rear wheels via passage 82 regardless of the movement of piston 62 to close passage 63. Consequently, the proportioning valve assembly 60 will be bypassed when deceleration is below the predetermined value regardless of the high fluid pressure level communicated from master cylinder 14 and conduit 20 to the control valve 24.

If the vehicle is moving up an incline, the ball 44 will move toward the seat 48 to engage the clutch link 56. So long as the clutch is engaged and the clutch pedal released, fluid pressure will communicate freely through inlet 34 past ball 44. When the clutch pedal is depressed, the clutch link 56 will move to the right to permit the ball 44 to engage seat 48 and define a check valve permitting one way communication of fluid pressure from the master cylinder 14 into the bore 28. If the vehicle is stopped on the incline, fluid pressure downstream of seat 48 will be trapped in the rear brakes upon termination of braking with the clutch pedal depressed. When the brakes are applied to hold the vehicle on the incline, increasing fluid pressure communicated to the bore 30 may cause the piston 62 to move to restrict fluid communication via passage 63. However, the ball 46 is spaced from seat 50, so that the increasing fluid pressure will be communicated to the rear brakes via passage 82 and the increasing fluid pressure will be trapped downstream of seat 48 even though the proportioning valve is restricting fluid communication through the passage 63 via poppet 64.

In summary, the control device 24 includes a proportioning valve assembly 60, a hill holder valve member 44 and an inertia sensing valve member 46. The inertia sensing valve member 46 is responsive to vehicle deceleration to close opening 84 and limit fluid communication to the rear wheels only through the proportioning valve assembly 60. Below a predetermined deceleration value, the opening 84 remains open to communicate substantially equal fluid pressures to the front and rear brakes, thereby bypassing the proportioning valve assembly via passage 82. It is also possible to bypass the proportioning valve assembly 60 via passage 82 when the vehicle is stopped on an incline to utilize full master cylinder fluid pressure at the rear brakes, thereby holding the vehicle on the incline when the brakes are released and the clutch pedal is depressed.

We claim:

1. A control device for a vehicle having a clutch-like assembly and a brake system wherein fluid pressure is generated in a master cylinder and communicated to a front brake and a rear brake, the control device being disposed in a connecting line between the master cylinder and rear brake so that fluid pressure generated in the master cylinder is communicated through the line to the rear brake via the control device, the control device comprising a proportioning valve responsive to a brake application to selectively alter fluid communication from the control device to the rear brake, and valve means associated with the proportioning valve to control operation of the latter, characterized in that said control device defines a pair of independent fluid paths communicating said master cylinder with said rear brake, said proportioning valve disposed within one of said pair of independent fluid paths and said valve means disposed in the other of said pair of independent fluid paths, said valve means including a pair of valve members and one of said valve members operating in response to the attitude of the vehicle and to the clutch-like assembly in order to close and maintain fluid pressure within the rear brake when the vehicle is disposed on a hill, and the other of said pair of valve members being inertia responsive in order to close and prevent fluid communication through said other independent fluid path and cause fluid communication through said one independent fluid path when deceleration of the vehicle is above a predetermined value.

2. The control device of claim 1, wherein said control device defines a housing with a pair of bores each forming a portion of a respective independent fluid path, one of said pair of bores including said valve means which includes a pair of seats opposing said pair of value members, respectively, and said pair of valve members comprising balls engageable, respectively, with said pair of seats.

3. The control device of claim 2, wherein said control device includes an inlet opening directly to said one bore and an outlet communicating directly with the other bore.

4. The control device of claim 1, wherein said control device includes a spacer disposed within said other independent fluid path and said spacer cooperates with said pair of valve members to maintain the valve members separate from each other.

5. The control device of claim 1, wherein said control device defines a housing with the fluid paths including therein a pair of bores, respectively, one of said bores receiving the proportioning valve and the other of said bores receiving the pair of valve members, said housing defining an inlet leading to the other bore and an outlet extending from the one bore, the other bore communicating with said valve means which includes a pair of seats cooperating respectively with said pair of valve members to selectively close communication through the other bore, and said housing defining a first passage extending from the one bore on one side of said proportioning valve to the other bore and downstream of one seat cooperating with said one valve member and upstream of the other seat, and a second passage extending from the one bore on the other side of said proportioning valve to the other bore and downstream of said other valve member.

6. The control device of claim 1 wherein said control device defines a housing with the fluid paths including therein a pair of bores, one of said bores receiving said proportioning valve and the other bore receiving said pair of valve members, said pair of bores extending to openings at opposite ends of said housing to substantially define an inlet at the other bore and an outlet at the one bore.

7. A control device for a vehicle having a clutch-like assembly and a brake system wherein fluid pressure is generated during braking for communication to a front brake and a rear brake, the control device comprising a housing with an inlet and an outlet and disposed in a fluid line providing the communication to the rear brake, an inertia sensing valve carried within the housing, a hill holder valve carried within the housing and coupled via suitable means with the clutch-like assembly, and a proportioning valve carried within the housing and responsive to fluid pressure communicated to the housing, the housing defining a pair of independent fluid paths between the inlet and outlet, the hill holder valve and inertia sensing valve being disposed in one of the independent fluid paths and the proportioning valve being disposed in the other independent fluid path so that when the hill holder valve and inertia sensing valve are in rest positions the one independent fluid path is open independently of operation of the proportioning valve.

8. The control device of claim 7, wherein the hill holder valve and inertia sensing valve comprise balls opposing each other in the housing.

9. The control device of claim 8, wherein the control device comprises spacer means disposed within said one independent fluid path and which cooperates with said inertia sensing valve and hill holder valve.

* * * * *